US007074336B1

(12) United States Patent
Teter et al.

(10) Patent No.: US 7,074,336 B1
(45) Date of Patent: *Jul. 11, 2006

(54) INORGANIC ION SORBENTS AND METHODS FOR USING THE SAME

(75) Inventors: David M. Teter, Edgewood, NM (US); Patrick V. Brady, Albuquerque, NM (US); James L. Krumhansl, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/886,175

(22) Filed: Jun. 20, 2001

(51) Int. Cl.
*C02F 1/28* (2006.01)

(52) U.S. Cl. ............... 210/683; 210/684; 210/911; 210/913

(58) Field of Classification Search ............... 210/683, 210/684, 911, 913
See application file for complete search history.

(56) References Cited

U.S. PATENT DOCUMENTS

| | | | | |
|---|---|---|---|---|
| 3,767,571 A | * | 10/1973 | Lorenc et al. | 210/671 |
| 3,931,007 A | * | 1/1976 | Sugano et al. | 210/717 |
| 4,134,831 A | * | 1/1979 | Dawson et al. | 210/683 |
| 4,201,667 A | | 5/1980 | Liao | 210/721 |
| 4,263,020 A | * | 4/1981 | Eberly | 95/136 |
| 4,326,961 A | * | 4/1982 | Lee et al. | 210/683 |
| 4,366,128 A | | 12/1982 | Weir et al. | 423/87 |
| 4,392,979 A | | 7/1983 | Lee et al. | 252/184 |
| 4,458,030 A | * | 7/1984 | Manabe et al. | 502/183 |
| 4,738,834 A | | 4/1988 | Moore et al. | 423/2 |
| 4,752,397 A | * | 6/1988 | Sood | 210/662 |
| 4,935,146 A | | 6/1990 | O'Neill et al. | 210/684 |
| 5,378,366 A | | 1/1995 | Yen | 210/667 |
| 5,505,857 A | | 4/1996 | Misra et al. | 210/709 |
| 5,556,545 A | | 9/1996 | Volchek et al. | 210/651 |
| 5,603,838 A | | 2/1997 | Misra et al. | 210/665 |
| 5,911,882 A | | 6/1999 | Benjamin et al. | 210/679 |
| 5,985,790 A | | 11/1999 | Moskovitz et al. | 502/415 |
| 6,030,537 A | | 2/2000 | Shaniuk et al. | 210/683 |
| 6,042,731 A | | 3/2000 | Bonnin | 210/679 |
| 6,238,570 B1 | * | 5/2001 | Sivavec | 210/913 |
| 6,830,695 B1 | * | 12/2004 | Brady et al. | 210/679 |

OTHER PUBLICATIONS

Pierce et al., "Adsorption of Arsenite and Arsenate on Amorphous Iron Hydroxide," Water Research, vol. 16, 1982, 1247-1253.

Xu et al., "Influence of pH and Organic Substance on the Adsorption of As(V) on Geologic Materials," Water, Air, and Soil Pollution 40 (1988) 293-305.

Benjamin et al., "Sorption and Filtration of Metals Using Iron-Oxide-Coated Sand," Water Research, vol. 30, No. 11, 1996, 2609-2620.

Singh et al., "Adsorption technique for the treatment of As(V)-Rich Effluents," Colloids and Surfaces A: Physicochemical and Engineering Aspects, 111, 1996, 49-56.

Matis et al., "Flotation Removal of As(V) onto Goethite," Environmental Pollution, vol. 97, No. 3, 1997, 239-245.

Driehaus et al., "Granular Ferric Hydroxide—A New Adsorbent for the Removeal of Arsenic from Natural Water," J. Water SRT—Aqua, 47, 1998, 30-35.

Balsley et al., "Anion Scavengers for Low-Level Radioactive Waste Repository Backfills," Journal of Soil Contamination, 7(2), 1998, 125-141.

Viravarghavan et al., "Arsenic in Drinking Water—Problems and Solutions," Water Science & Technology, vol. 40, No. 2, 1999, 69-76.

Fryxell et al., "Design and Synthesis of Selective Mesoporous Anion Traps," Chemistry of Materials, vol. 11, No. 8, 1999, 2148-2154.

Lefèvre et al., "Uptake of Iodide by a Mixture of Metallic Copper and Cupric Compounds," Environmental Science & Technology, vol. 33, No. 10, 1999, 1732-1737.

Lefèvre et al., "Sorption of Iodide on Cuprite ($Cu_2O$)," Langmuir, vol. 16, No. 10, 2000, 4519-4527.

Wu et al., "Competitive Adsorption of Molybdate, Chromate, Sulfate, Selenate, and Selenite on $\gamma$-$Al_2O_3$," Colloids and Surfaces A: Physicochemical and Engineering Aspects, 166, 2000, 251-259.

Chiu et al., "Arsenic Adsorption and Oxidation at Manganite Surfaces. 1. Method for Simultaneous Determination of Adsorbed and Dissolved Arensic Species," Environmental Science & Technology, vol. 34, No. 10, 2000, 2029-2034.

\* cited by examiner

*Primary Examiner*—Ivars C. Cintins
(74) *Attorney, Agent, or Firm*—Russell D. Elliott; Janeen Vilven-Doggett

(57) ABSTRACT

A process and medium for decontamination of water containing anionic species including arsenic and chromium, wherein compounds comprising divalent and trivalent metal oxides and sulfides are used to form surface complexes with contaminants under pH conditions within the range of potable water. In one embodiment natural and synthetic spinels and spinel-like materials are used as the sorbent substance.

1 Claim, No Drawings

INORGANIC ION SORBENTS AND METHODS FOR USING THE SAME

This invention was made with support from the United States Government under Contract DE-AC04-96AL85000 awarded by the U.S. Department of Energy. The Government has certain rights in this invention.

BACKGROUND OF THE INVENTION

1. Field of the Invention

This invention pertains to decontamination of fluids containing ionic contaminants, especially water containing anionic contaminants. In particular, the invention relates to the removal of arsenic contaminants and chromate from water by treating the water using adsorbent compounds comprised of divalent and trivalent metal oxides and sulfides.

2. Description of the Related Art

For purposes of this disclosure, unless otherwise specified, the term "metal oxides" is intended to include both metal oxides and metal hydroxides. Likewise, the term "metal sufides" is intended to include both metal sulfides and metal hydrosulfides. Similarly, for purposes of this disclosure, "arsenic contaminants" includes both arsenates and arsenites.

Arsenic contaminants are examples of anionic contaminants that may be present in water as a result of natural as well as human-mediated causes. The long-term availability of safe and affordable drinking water depends, in part, on availability of effective and economical treatment means for removing arsenic contaminants (as well as other anionic contaminants including chromate) from water. Successful treatment strategies, in turn, depend on not otherwise significantly altering the water characteristics (for example, its pH) in ways that would make it non-potable.

Arsenic and other anionic contaminants likewise pose risks when present in fluids other than drinking water sources. For example, waste water streams often contain such contaminants and require remediation even where they are not considered to be directly associated with potable drinking water sources.

Various sorbent methods for removing arsenic contaminants and other anionic contaminants from water have been used and developed previously. For example, certain trivalent metal hydroxide compounds, such as $Al_2O_3$ and $Fe_2O_3$, have been demonstrated to sorb anionic contaminants, including arsenic contaminants, from water. A drawback associated with use of such trivalent compounds alone is that, because they typically exhibit a point of zero charge from pH 7 to 9, the water to be treated may need to be acidified in order for these compounds to sorb anions to a significant degree. Thus, after treatment, in order to restore the potability of the treated water, further amendments must be added to bring the pH back up to a safely drinkable range. Similarly, tetravalent metal oxides such as $SiO_2$ could be effective anion sorbents, however, their point of zero charge is typically around pH 2, so extremely acidic conditions would needed for tetravalent metal oxides to sorb anions. Additionally, these substances are considered likely to fall outside of the range of useful sorbents because of other chemical issues associated with operating at such low pH.

The divalent oxide MgO, likewise, has been shown chemically to sorb anions including arsenic in water. Although use of MgO does not necessitate driving the pH of water outside of the potable range (divalent metal oxides tend to exhibit a point of zero charge that is pH 10 or higher), the effectiveness of MgO as a sorbent for water decontamination, however, can be limited. This is due to its tendency to form carbonates in the presence of carbon in the water from natural (e.g. biological and atmospheric) sources. When this occurs, the carbonate species formed at the surface lack any significant electrostatic attraction for negatively-charged ions. Thus, the sorbency of the MgO can be short-lived absent taking steps to reverse of the carbonate reaction and restore the sorbent.

The sorbency methods just discussed rely on the electrostatic attraction between positively charged surface species and negatively charged contaminants. An altogether different mechanism that has been exploited to decontaminate water containing ionic contaminant species is ion exchange. Examples of ion exchange materials suitable for water decontamination include hydrotalcites (which exchange anions) and zeolites (which exchange cations). Although ion exchange materials have been shown to be effective without causing the types of problems associated with $Fe(OH)_3$ and $Al_2O_3$ (pH concerns) or MgO (carbonate issues), ion exchange materials can be very expensive. Zeolites that allow for separations based on size are also used in some decontamination applications, but they do not sorb anionic species such as chromate and arsenic contaminants in water.

Therefore, the need remains for improved liquid decontamination approaches that are inexpensive, yet effective in removing anionic contaminants, including chromate, arsenates and arsenites.

SUMMARY OF THE INVENTION

In one aspect, the invention provides a water decontamination process comprising contacting water containing anionic contaminants with sorbent material that binds anionic species predominantly through the formation of surface complexes, wherein the sorbent material comprises divalent metals and trivalent metals.

In another aspect, the invention provides a decontamination medium for water comprising sorbent material that binds anionic species predominantly through the formation of surface complexes, wherein the sorbent material comprises divalent metals and trivalent metals.

DETAILED DESCRIPTION OF THE INVENTION

This invention utilizes the principle that metal oxides and metal sufides, at pH below their point of zero charge, attract negatively charged species. This is due to a phenomenon wherein, at pH below the point of zero charge for a given metal oxide or metal sufide, surface metal groups tend to be more fully protonated (and thus more likely to exhibit a positive charge) than at pH at or above the point of zero charge. As a result, at pH below the point of zero charge, negatively-charged species can be removed from solution through the formation of ion-bearing surface complexes with the metal oxide or metal sulfide surface groups.

The mixed divalent and trivalent metal oxide and metal sulfide materials employed in the present invention to adsorb negatively-charged contaminant species in water do so at pH within the drinkable range for water. Moreover, the materials tested do not exhibit the tendency to form carbonates to a degree sufficient to render them inactive for purposes of anion sorption. According to the invention, sorbent materials effective for sequestering arsenic-containing contaminants from water are selected, or can be engineered, to exhibit a point of zero charge that permits anion sorption in the pH range of potable water.

An example of mixed valency inorganic materials capable of sorbing anions such as arsenic contaminants and chromate in water is found in natural and synthetic spinels and inverse spinels, as well as "spinel-like" materials. These inorganic materials are generally characterized by the chemical formula $(AB_2X_4)_n$ where A and B represent cations of differing valencies (such as $A=Mg^{2+}$ and $B=Al^{3+}$) and X represents one or more anions (such as $O^{2-}$ or $S^{2-}$) and n is at least 1. (For purposes of this disclosure, these stoichiometries are intended to be approximate so that where the formula $(AB_2X_4)_n$ is used in this disclosure, this means that B has a prevalence of about twice that of A and X has a prevalence of about four times that of A. Also, in this disclosure, "spinel-like" is intended to encompass substances generally exhibiting the stoichiometry just noted, but which tend to be poorly crystalized. "Spinel-like" includes structures tend to approximate the spinel structure and also generally exhibit x-ray diffraction patterns typical of natural or synthetic spinels).

Examples of natural spinels suited for application according to the invention include $MgAl_2O_4$ (Spinel), $MnAl_2O_4$ (Galaxite), $FeAl_2O_4$ (Hercynite), $ZnAl_2O_4$ (Gahnite), $MgFe_2O_4$ (Magnesioferrite), $MnFe_2O_4$ (Jacobsite), $Fe_3O_4$ (Magnetite), $ZnFe_2O_4$ (Franklinite), $NiFe_2O_4$ (Trevorite), $CuFe_2O_4$ (Cuprospinel), $Fe_3S_4$ (Greigite), $MgCr_2O_4$ (Magnesiochromite), $(Mn,Fe)(Cr,V)_2O_4$ (Manganochromite), $FeCr_2O_4$ (Chromite), $(Ni,Fe)(Cr,V)_2O_4$ (Nichromite), $(Co,Ni)(Cr,Al)_2O_4$ (Cochromite), $MgV_2O_4$ (Magnesiocoulsonite), $FeV_2O_4$ (Coulsonite), $(Mn,Fe)(V,Cr)_2O_4$ (Vuorelainenite), $Mn_3O_4$ (Hausmannite), $CuCO_2S_4$ (Carrolite), $CuBi_2O_4$ (Kusachiite), $Mn(Mn,Fe)_2O_4$ (Iwakiite) and $ZnMn_2O_4$ (Hataerolite).

The sorbent material comprises a chemical substance selected from the group consisting of a first composition in which a species A has a prevalence of about half that of a species B, and a species X has a prevalence of about four times that of the species A wherein for either composition A and B are metal species and X is selected from the group consisting of oxygen and sulfur. The sorbent material comprises a chemical substance having the first composition, and A is selected from the group consisting of $Co^{2+}$, $Cu^{2+}$, $Fe^{2+}$, $Mg^{2+}$, $Mn^{2+}$, $Ni^{2+}$, $Zn^{2+}$, and combinations thereof, and B is selected from the group consisting of $Al^{3+}$, $Bi^{3+}$, $Co^{3+}$, $Cr^{3+}$, $Fe^{3+}$, $Mn^{3+}$, $Ni^{3+}$, $V^{3+}$ and combinations thereof.

For purposes of this invention, compounds having generally the $AB_2X_4$ formula A can include any of the following: $Co^{2+}$, $Cu^{2+}$, $Fe^{2+}$, $Mg^{2+}$, $Mn^{2+}$, $Ni^{2+}$ and $Zn^{2+}$, and B can include any of the following: $Al^{3+}$, $Bi^{3+}$, $Co^{3+}$, $Cr^{3+}$, $Fe^{3+}$, $Mn^{3+}$ and $V^{3+}$.

In demonstrating the present invention, it has been shown that adsorption of arsenic contaminants by mixed valency inorganic materials occurs largely independently of their degree of crystallization. For purposes of the present invention, it is recognized that the degree of crystallinity of, for example, spinel and spinel-like materials can vary from a slightly disordered amorphous material to a highly ordered material characterized by the face-centered cubic structures typically associated with natural spinels. This variability in crystallinity depends on factors such as particle size, exposure to heat, and time. Yet, according to the invention, so long as metal oxide and/or metal sufide groups in a protonated state are in contact with the liquid containing the anionic contaminants, those anionic species can be successfully sorbed.

At any given pH, the extent of sorption is measured in terms of $K_d$ (ml/g). This value represents the sorption coefficient, that is, the ratio of contaminant sorbed (moles/g) to contaminant in solution (moles/ml):

$$Kd(\text{ml/g}) = [(Co-Ce)/Ce] \times [Vsol(\text{cc})/Mads(\text{g})]$$

where Co represents initial concentration, Ce represents final concentration, Vsol represents total volume of solution, and Mads represents total mass of adsorbent. Materials with Kd values greater than 100 ml/g are generally considered strong candidates for use as contaminant sorbents.

Without further elaboration, it is believed that one skilled in the art can, using the preceding description, utilize the present invention to its fullest extent. The following example of an embodiment is therefore intended to be construed as merely illustrative and not limitative of the remainder of the disclosure in any way whatsoever.

EXAMPLE

The following is an example showing synthesis, characterization and testing of $MgAl_2O_4$ for purposes of decontamination of arsenic-containing aqueous solutions.

Synthesis and Characterization: A 500 ml solution of 0.14M $Mg(NO_3)_2 \cdot 6H_2O$ (reagent grade) in deionized water was combined with a 500 ml solution of $Al(NO_3)_3 \cdot 9H_2O$ (reagent grade) in deionized water and mixed thoroughly using a magnetic stirrer. A solution of 3M NaOH (reagent grade) was added dropwise until the mixture reached a pH of approximately 9.0, at which point the $Mg^{+2}$ and $Al^{+3}$ precipitated out of solution as mixed hydroxides. These precipitates were allowed to age for 24 hours at 298K, and were then centrifuged and washed multiple times with deionized water to remove all $NaNO_3$ salts. The precipitates were then filtered with a Millipore pneumatic filter apparatus using a 0.45 μM filter and then mixed with 500 ml of pure ethanol (reagent grade). The resulting slurry was then allowed to dry in trays at ambient temperature and humidity. These powders were then divided into three groups (unheated), heated for 4 hours at 673K in an oxidizing atmosphere, and heated for 4 hours at 1073K in an oxidizing atmosphere. These powders were then characterized using X-ray diffraction. The results of these analyses are included in Table 1.

Testing: Batch sorption experiments were then performed to test the ability of $MgAl_2O_4$ to sorb arsenate (AsV) and chromate (Cr6). Solutions containing 100 ppb, 1 ppm, and 100 ppm of arsenate (or chromate) in a tap water matrix were synthesized. The analysis of the tap water is given in Table 2. In these experiments, 0.25 g of the unheated and heat-treated sorbents were mixed with 20 ml of the arsenic containing solutions for a contact time of 5 minutes. The solutions were then filtered using a 0.2 um filter and the resulting arsenic concentration was analized using inductively coupled plasma mass spectroscopy (ICP-MS). The results of these analysis and the calculated Kd's are presented in Table 3.

Similar synthesis was performed for a number of other compounds. Table 1 presents x-ray diffraction results showing phases resulting for various stoichiometries at different temperatures. Table 2 presents an analysis of the tap water matrix used prior to adding arsenic. This is instructive since it demonstrates, in conjunction with Table 3, that parts per billion levels of arsenic can be removed from water using the invention even where parts per million levels of other naturally occurring substances are present in the water. Table 3 presents sorption results for both arsenic and chromate.

TABLE 1

|  | Unheated (298° C.) | 400° C. | 800° C. |
|---|---|---|---|
| $CoAl_2O_4$ | $Al(OH)_3$ + CoOOH | $CoAl_2O_4$ (spinel) | $CoAl_2O_4$ (spinel) |
| $CuAl_2O_4$ | $CuAl_2O_4$ (spinel-like) + CuO | $CuAl_2O_4$ (spinel-like) + CuO | $CuAl_2O_4$ (spinel) |
| $MgAl_2O_4$ | $Al(OH)_3$ + $Mg(OH)_2$ | $MgAl_2O_4$ (spinel-like) | $MgAl_2O_4$ (spinel) |
| $NiAl_2O_4$ | $Al(OH)_3$ + NiOOH | $NiAl_2O_4$ (spinel-like) | $NiAl_2O_4$ (spinel) |
| $ZnAl_2O_4$ | $Zn_6Al_2(OH)_{16}CO_3 4H_2O$ + $Al(OH)_3$ | $ZnAl_2O_4$ (spinel-like) | $ZnAl_2O_4$ (spinel) |
| $CuCr_2O_4$ | $Cu_3CrO_6.2H_2O$ + $Cr(OH)_3$ | $CuCr_2O_4$ (spinel-like) + $Cr_2O_3$ | $CuCr_2O_4$ (spinel-like) + $Cr_2O_3$ |
| $CuFe_2O_4$ | $CuFe_2O_4$ (spinel-like) | $CuFe_2O_4$ (spinel) + CuO + $Fe_2O_3$ | $CuFe_2O_4$ (spinel) |
| $MgFe_2O_4$ | $MgFe_2O_4$ (spinel-like) | $MgFe_2O_4$ spinel) | $MgFe_2O_4$ (spinel) |
| $ZnFe_2O_4$ | $ZnFe_2O_4$ (spinel-iike) | $ZnFe_2O_4$ (spinel) | $ZnFe_2O_4$ (spinel) |

TABLE 2

(General Chemistry Analysis of Tap Water Matrix)

| pH | 7.7 |
|---|---|
| Chloride | 33 ppm |
| Silica | 40 ppm as $SiO_2$ |
| Sulfate | 26 ppm |
| Fluoride | 1 ppm |
| Bicarbonate | 106 ppm as $CaCO_3$ |

TABLE 3

ARSENIC SORPTION

| Material | Arsenic Init. Conc (ppb) | Arsenic Final Conc. (ppb) | Kd (ml/g) |
|---|---|---|---|
| $CoAl_2O_4$ (spinel-800 C.) | 132 | 2 | 5200 |
| $CuAl_2O_4$ (spinel-like-400 C.) | 132 | <0.2 | 52720 |
| $CuAl_2O_4$ (spinel-800 C.) | 132 | 1.9 | 5478 |
| $MgAl_2O_4$ (spinel-like-400 C.) | 192 | 5 | 2992 |
| $MgAl_2O_4$ (spinel-800 C.) | 192 | 16 | 880 |
| $NiAl_2O_4$ (spinel-like-400 C.) | 132 | <0.2 | 52720 |
| $NiAl_2O_4$ (spinel-800 C.) | 132 | 2.6 | 3982 |
| $ZnAl_2O_4$ (spinel-like-400 C.) | 132 | <0.2 | 52720 |
| $ZnAl_2O_4$ (spinel-800 C.) | 132 | 0.7 | 15006 |
| $Co_3O_4$ (spinel-400 C.) | 132 | 4.5 | 2267 |
| $CuFe_2O_4$ (spinel-like-unheated) | 132 | 0.4 | 26320 |
| $CuFe_2O_4$ (spinel-400 C.) | 132 | 13 | 732 |
| $MgFe_2O_4$ (spinel-like-unheated) | 132 | 0.72 | 14587 |
| $MgFe_2O_4$ (spinel-400 C.) | 132 | 1.2 | 8720 |
| $ZnFe_2O_4$ (spinel-like-unheated) | 132 | 0.9 | 11653 |
| $ZnFe_2O_4$ (spinel-400 C.) | 132 | 6.7 | 1496 |

CHROMATE SORPTION

| Material | Cr Init. Conc (ppb) | Cr Final Conc. (ppb) | Kd (ml/g) |
|---|---|---|---|
| $CoAl_2O_4$ (spinel-800 C.) | 1010 | 3 | 26853 |
| $CuAl_2O_4$ (spinel-800 C.) | 1010 | 81 | 916 |
| $MgAl_2O_4$ (spinel-like-400 C.) | 1010 | 122 | 582 |
| $NiAl_2O_4$ (spinel-like-400 C.) | 1010 | 3 | 26853 |
| $NiAl_2O_4$ (spinel-800 C.) | 1010 | 104 | 697 |
| $ZnAl_2O_4$ (spinel-like-400 C.) | 1010 | 3 | 26853 |
| $CuFe_2O_4$ (spinel-like-unheated) | 1010 | 40 | 1940 |
| $MgFe_2O_4$ (spinel-like-unheated) | 1010 | 39 | 1992 |
| $MgFe_2O_4$ (spinel-400 C.) | 1010 | 31 | 2526 |

From the foregoing description, one skilled in the art can easily acertain the essential characteristics of the invention defined in this specification and the appended claims, and without departing from the spirit and scope thereof can make various changes and modifications of the invention to adapt it to various usages and conditions. Such changes and modifications as would be obvious to one skilled in the art are intended to be included within the scope of the following claims. Additional advantages and novel features will become apparent to those skilled in the art upon examination of the following description or may be learned by practice of the invention.

We claim:

1. A process for decontaminating water, comprising:
   selecting a sorbent material that binds anionic species predominantly through the formation of surface complexes, said sorbent material comprising a composition including formula $(AB_2X_4)_n$, wherein A is a divalent cation, B is a trivalent cation, X is an anion species and n is at least one,
   wherein, said selected sorbent material is $CuFe_2O_4$; and
   decontaminating water by contacting said selected sorbent material with water containing anionic contaminants selected from the group consisting of species including chromium and species including arsenic, said decontaminating substantially removing the anionic contaminants.

* * * * *